(12) United States Patent
Oh

(10) Patent No.: US 6,786,464 B2
(45) Date of Patent: Sep. 7, 2004

(54) PNEUMATIC VALVE

(75) Inventor: Ssang-Suk Oh, Osan (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 163 days.

(21) Appl. No.: 10/102,984

(22) Filed: Mar. 22, 2002

(65) Prior Publication Data
US 2002/0148993 A1 Oct. 17, 2002

(30) Foreign Application Priority Data
Apr. 12, 2001 (KR) .......................... 2001-19636

(51) Int. Cl.$^7$ .......................................... F16K 31/122
(52) U.S. Cl. ..................... 251/63.5; 251/355
(58) Field of Search .................. 251/62, 63, 63.4, 251/63.5, 63.6, 335.3, 355; 92/36, 40, 42; 184/6.8, 6.9, 80, 82

(56) References Cited

U.S. PATENT DOCUMENTS

| | | | | |
|---|---|---|---|---|
| 2,356,748 A | * | 8/1944 | Boynton ................. | 251/355 X |
| 2,885,173 A | * | 5/1959 | Dobrick .................. | 92/40 X |
| 3,212,260 A | * | 10/1965 | Gardner .................. | 92/40 X |
| 4,309,022 A | * | 1/1982 | Reinicke et al. ....... | 251/63.6 X |
| 4,526,341 A | * | 7/1985 | Thomas .................. | 251/63.5 |
| 4,827,963 A | * | 5/1989 | Baker et al. ........... | 251/63.6 X |
| 5,634,627 A | * | 6/1997 | Daido et al. ........... | 251/335.3 |
| 5,678,595 A | * | 10/1997 | Iwabuchi ............... | 251/335.3 X |
| 5,678,803 A | * | 10/1997 | Shinohara et al. ..... | 251/335.3 X |
| 5,848,608 A | * | 12/1998 | Ishigaki ................. | 137/599.16 |
| 5,924,672 A | * | 7/1999 | Crochet et al. ......... | 251/63.6 |

FOREIGN PATENT DOCUMENTS

JP     10-252943     9/1998

\* cited by examiner

Primary Examiner—David A. Scherbel
Assistant Examiner—Eric Keasel
(74) Attorney, Agent, or Firm—Lee & Sterba, P.C.

(57) ABSTRACT

A pneumatic valve includes a cylinder having at least one gas port for providing inflow and outflow of a gas; a piston arranged in the cylinder and performing a reciprocating, straight-line movement in response to the inflow and outflow of the gas; a first valve shaft passing through the piston and having a first end portion including a first coupling portion; and a second valve shaft including a second coupling portion and having a first end portion protruding from the cylinder, wherein the second coupling portion is coupled to the first coupling portion.

17 Claims, 5 Drawing Sheets

PNEUMATIC VALVE

BACKGROUND OF THE INVENTION

1. Field of the Invention

The present invention relates to a pneumatic valve. More particularly, the present invention relates to a pressure-controlled valve for creating mechanical movement.

2. Description of the Related Art

A conventional air valve is typically installed between a vacuum pump generating a vacuum pressure and a reactor using the vacuum pressure. The air valve serves to connect the vacuum pump and the reactor when needed. Such an air valve is operated by air pressure and includes a bellows that can be constricted by an applied air pressure. One such conventional air valve includes a cylinder, a piston interior to the cylinder, and a valve shaft. A plurality of ports are included in the cylinder to allow pressurized air to be supplied to, or discharged from, a head of the piston. In response to such an inflow or outflow of air, the piston is forced in a reciprocating, straight-line mechanical movement. The straight-line movement of the piston is transferred to the bellows by the connecting valve shaft, which connects a central portion of the piston to the bellows using a nut. The movement of the bellows in turn opens or closes a ventilation passage of a valve body.

A significant disadvantage of such a valve configuration is that, over time, the nut may loosen due to the repeated movement of the piston, eventually causing the piston to be separated from the bellows. In order to re-attach the piston and the bellows or to tighten the nut the cylinder must be disassembled.

SUMMARY OF THE INVENTION

A feature of an embodiment of the present invention provides a pneumatic valve having an improved coupling mechanism between a valve shaft and a piston.

Another feature of the present invention provides a pneumatic valve having a piston with a long life span.

According to a preferred embodiment of the present invention, a pneumatic valve includes a cylinder having at least one gas port for providing an inflow and an outflow of a gas; a piston arranged in the cylinder that performs a reciprocating, straight-line movement in response to the inflow and outflow of the gas; a first valve shaft passing through the piston having a first end portion including a first coupling portion; and a second valve shaft including a second coupling portion and having a first end portion protruded from the cylinder, wherein the second coupling portion is coupled to the first coupling portion, such that straight-line movements of the piston are transferred in a longitudinal direction of the first and second valve shafts.

Preferably, the first and second coupling portions have a threaded interface capable of mating, wherein the first coupling portion includes a male threaded screw portion, and the second coupling portion includes a female threaded screw portion.

The second valve shaft further includes a second end portion having a flange portion contacting the piston. The first end portion of the second valve shalt includes a tightening protrusion that may be tightened using a tightening tool. The tightening protrusion may have a groove or a polygon-shaped protrusion. Preferably, the pneumatic valve further includes a bellows arranged around a second end portion of the first valve shalt, an elastic member arranged between an outer surface of the cylinder and the bellows, and a lubricant injection apparatus for injecting a lubricant, such as oil, to an inner surface of the cylinder through the second valve shaft, which preferably includes at least one lubricant passage therein.

The present invention provides several advantages over conventional air valves. One, since a connection between the first and second valve shafts may be tightened by tightening the protruding second end portion of the second valve shaft without disassembling the cylinder, a loosened coupling between the first valve shaft and second valve shaft may be facilely repaired. Second, since friction between the piston and an inner surface of the cylinder is reduced by the application of a lubricant, a pneumatic valve having a piston with a long life span may be achieved.

These and other features and advantages of the present invention will be readily apparent to those of ordinary skill in the art upon review of the detailed description that follows.

BRIEF DESCRIPTION OF THE DRAWINGS

For a more complete understanding of the present invention and the advantages thereof, reference is now made to the following descriptions taken in conjunction with the accompanying drawings, in which like reference numerals indicate like elements throughout.

DETAILED DESCRIPTION OF THE INVENTION

Korean Patent Application No. 2001-19636, filed on Apr. 12, 2001, and entitled: "Air Valve," is incorporated by reference herein in its entirety.

In the following description, the term "air" and "pneumatic" should be interpreted broadly to include any compressed, gaseous compound that may be satisfactorily used to power the mechanical movements of the elements of the present invention. Further, although in the following description, drawing orientations are occasionally referenced as being "up" or "down," this is for explanatory purposes only and not meant to be limiting, since the pneumatic valve of the present invention may be arranged in any useful orientation.

Figure 1:
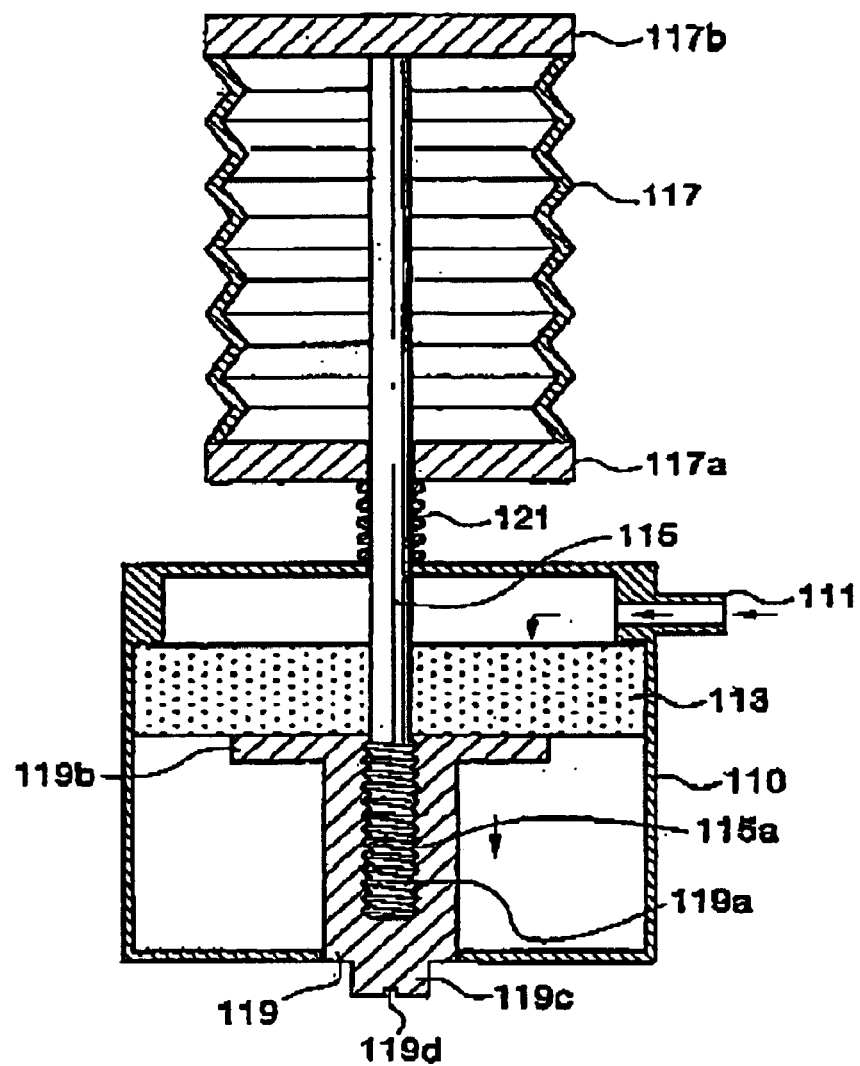
FIG. 1 illustrates a cross-sectional view of a pneumatic valve according to a preferred embodiment of the present invention.

FIG. 1 illustrates a cross-sectional view of a pneumatic valve 100 according to a preferred embodiment of the present invention. Pneumatic valve 100 includes a cylinder 110, a piston 113, a first valve shaft 115, and a second valve shaft 119.

The cylinder 110 further includes a gas port 111 through which pressurized gas inflows or outflows. The piston 113, which is preferably made of rubber, performs a reciprocating, straight-line movement in a longitudinal direction of the first and second valve shaft in response to the pneumatic pressure being applied or released through gas port 111.

The first valve shaft 115 is installed to pass through a central portion of the piston 113 and has a male threaded screw portion 115a on a first, lower end portion thereof. A bellows 117 is arranged to surround a second, upper end portion of the first valve shaft 115. The second valve shaft 119 includes a female threaded screw portion 119a into which the male threaded screw portion 115a of the first valve shaft 115 is inserted and rotated in a tightening direction so that first valve shaft 115 is securely coupled to second valve shaft 119. Second valve shaft 119 has a sufficient length so that a first, lower end portion thereof protrudes outwardly from the cylinder 110 when the piston 113 is at the uppermost location of the cylinder 110, i.e., nearest the bellows.

Bellows 117 further includes pneumatic sealing plates 117a and 117b on lower and upper portions thereof, respectively. An elastic member 121 having an elastic force for returning piston 113 to an un-pressurized position is arranged to surround a portion of the first valve shaft 115 between cylinder 110 and bellows 117.

The second valve shaft 119 farther includes a second, upper end portion having a flange portion 119b and the first, lower end portion having a tightening protrusion 119c. The flange portion 119b supports a bottom surface of the piston 113, so that pressure applied to piston 113 forces second valve shaft 119 in a direction that compresses bellows 117 and elastic member 121, and release of that pressure causes elastic member 121 to force second valve shaft 119 and piston 113 in a direction that allows expansion of bellows 117. Tightening portion 119c may be tightened using a tightening tool, when the coupling between the first and second valve shafts, 115 and 119, respectively, becomes loosened due to a repeated reciprocating, straight-line movement of the piston 113.

Figure 2:
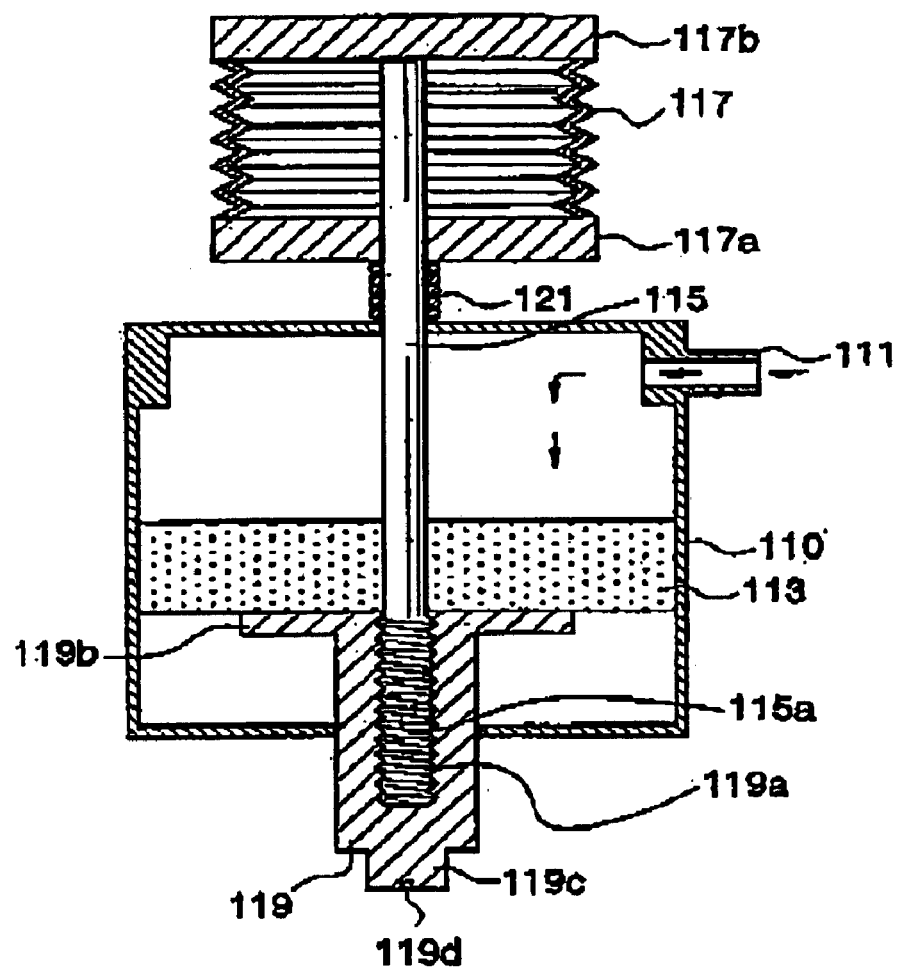
FIGS. 2 and 2A illustrate cross-sectional views of the pneumatic valve of FIG. 1 in a compressed operational state.
Figure 2A:
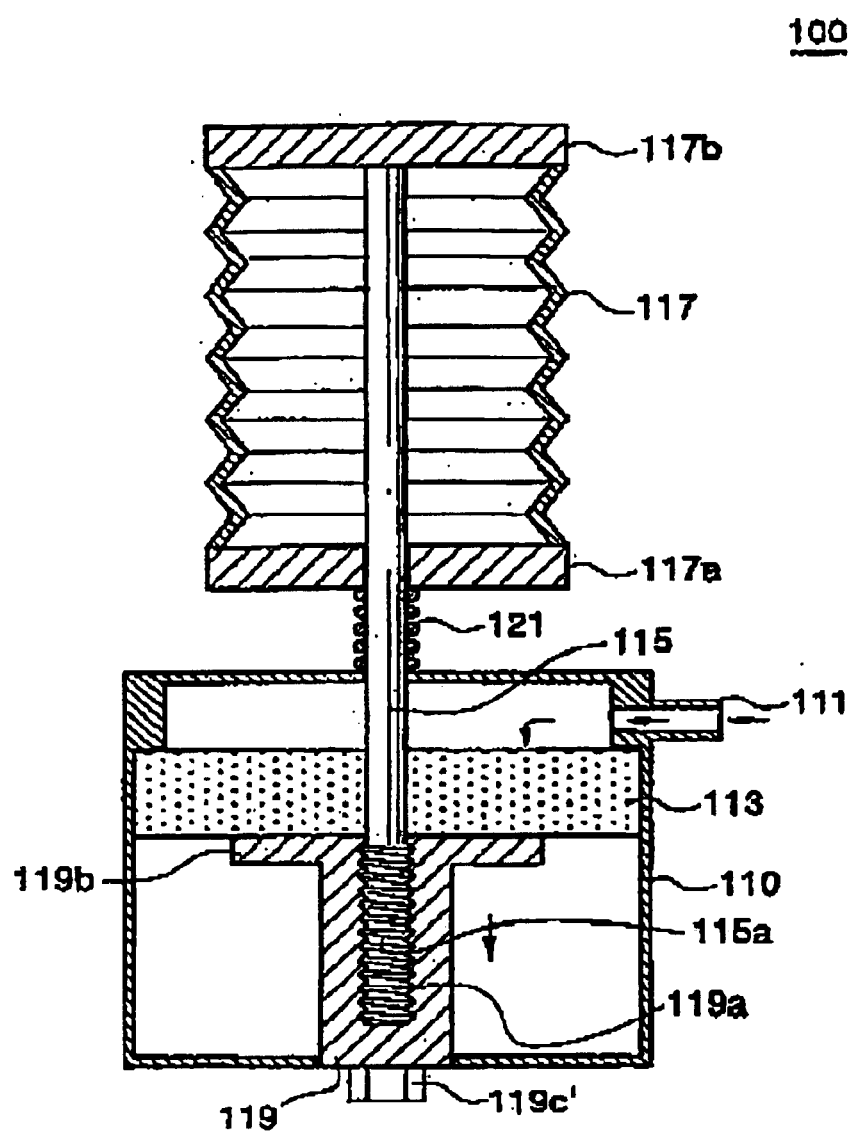

Operation of the pneumatic valve of FIG. 1 is explained below with reference to FIGS. 2 and 2A, which illustrate cross-sectional views of a pressurized operational state of the pneumatic valve of FIG. 1. First, when pressurized gas is supplied to cylinder 110 through the gas port 111, piston 113 and the coupled first and second valve shafts 115 and 119, respectively, are formed to move in a direction indicated by the arrows in FIGS. 2 and 2A. This movement causes bellows 117 and elastic member 121 to be compressed.

When gas pressure on piston 113 is released via a discharge through the gas port 111, elastic member 121 pushes up the sealing plate 117a by its restoration, such that the piston 113 and the first and second valve shafts 115 and 119 move up.

The supply and discharge of gas through the gas port 111 may be accomplished using an apparatus for changing a flow direction of gas, such as a solenoid valve installed on an end portion of a gas line (not shown) to be coupled to the gas port 111. More specifically, the solenoid valve opens a gas-supplying passage during a gas-supplying operation, or closes the gas-supplying passage while simultaneously opening a gas-discharging passage during a gas-discharging operation, according to a movement of a spool built therein.

A threaded screw coupling between the first valve shaft 115 and the second valve shaft 119 may become loosened by repeated up and down movements of the piston 113. However, unlike in conventional air valves, a loosened screw coupling between the first valve shaft 115 and the second valve shall 119 in the present invention may be facilely repaired or tightened without disassembling piston 113 from cylinder 110. This tightening may be accomplished by simply rotating or adjusting the tightening protrusion 119c, using a tightening tool that would fit a groove 119d, as shown in FIG. 2, or the tightening protrusion 119c' may have a polygon-shape, as shown in FIG. 2A.

Additionally, unless adequately lubricated, repeated movement of piston 113 produces friction between piston 113 and an inner surface of the cylinder 110, thereby reducing the life span of the piston due to degradations, such as scratching and/or warping. In order to provide such lubrication, pneumatic valve 100 preferably includes a lubricant injection apparatus, such as that shown in FIGS. 3 and 4, wherein the second valve shaft 119 is coupled to a lubricant injection apparatus 200.

Figure 3:
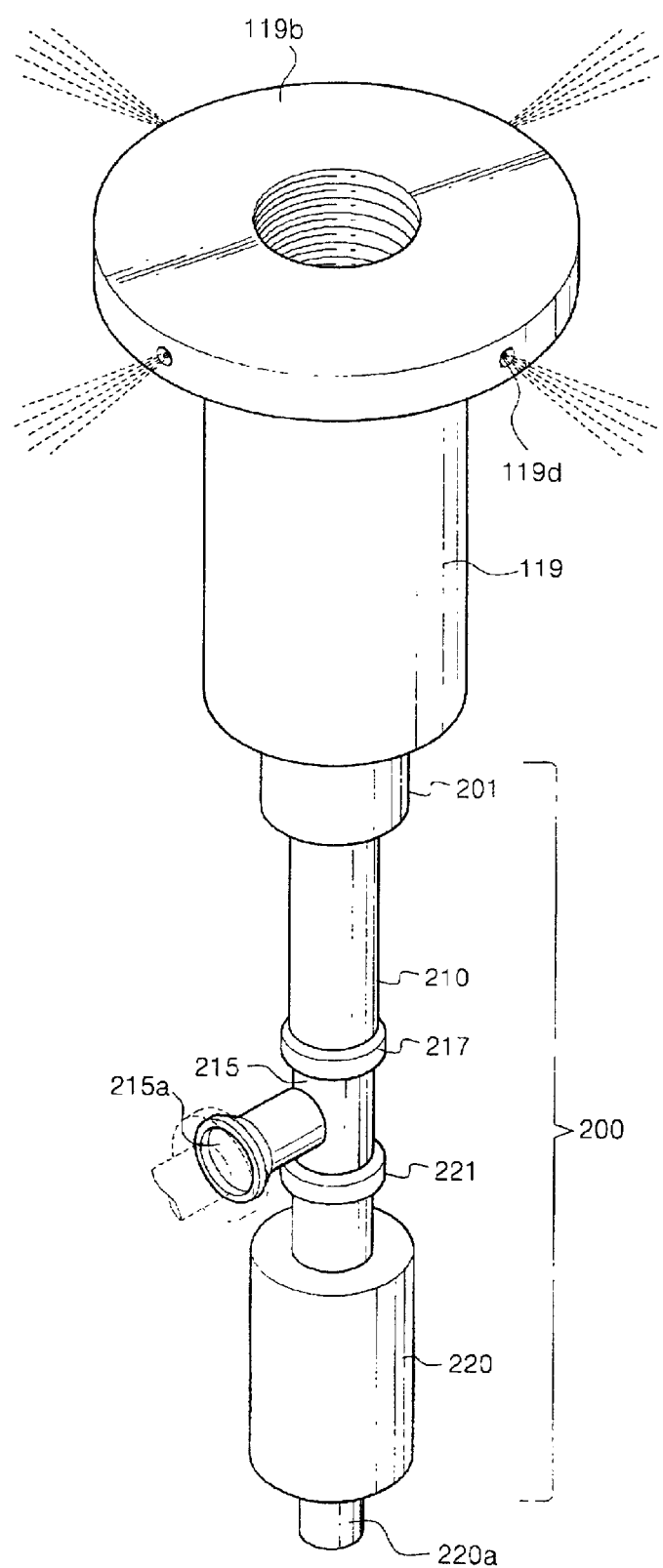
FIG. 3 illustrates a perspective view showing a state wherein a second valve shaft of the pneumatic valve is coupled to a lubricant injection apparatus.
Figure 4:
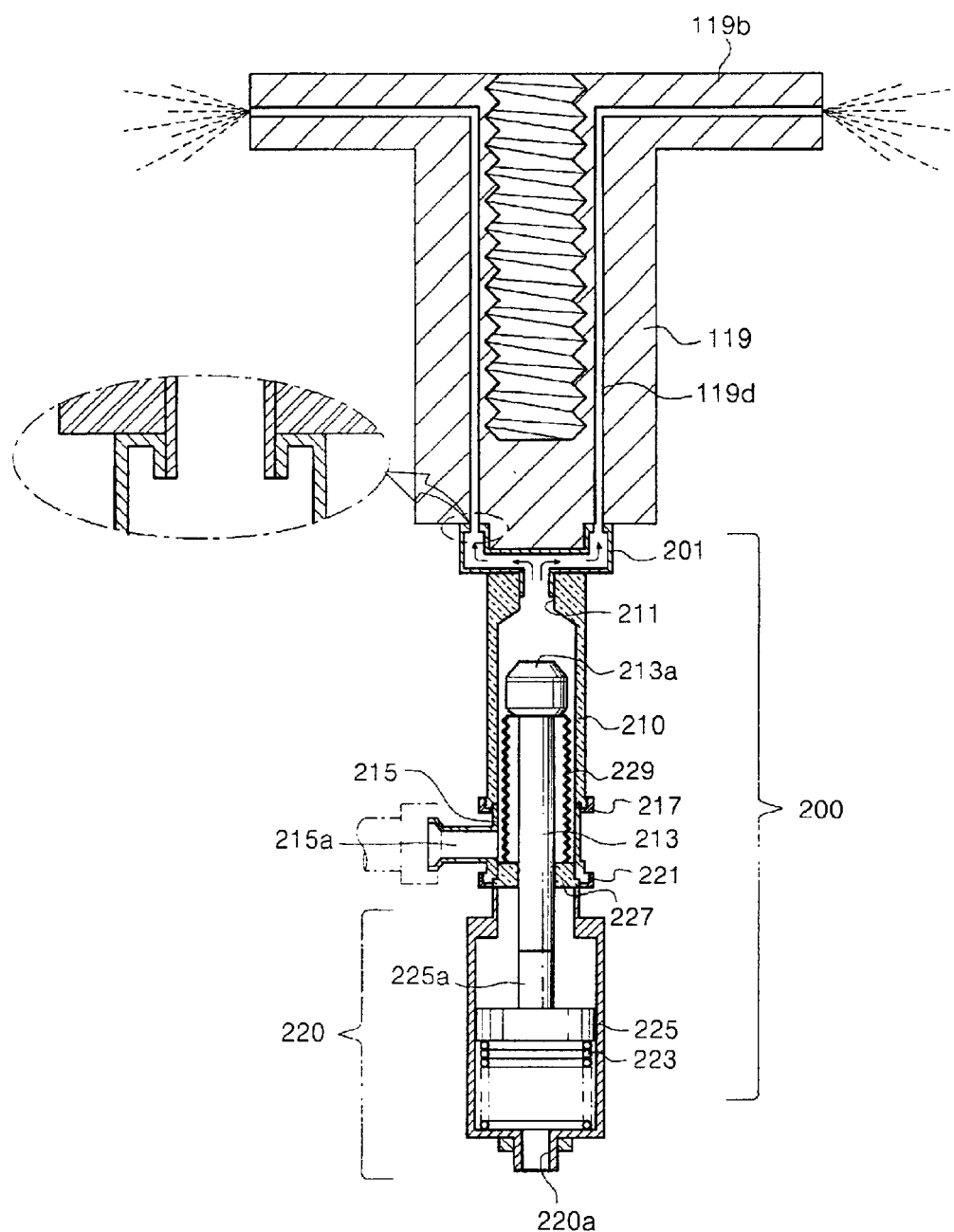
FIG. 4 illustrates a cross-sectional view of the portion of the pneumatic valve shown in FIG. 3.

As shown in FIGS. 3 and 4, the second valve shaft 119 further includes a plurality of lubricant passages 119d formed therein. The second valve shaft 119 is coupled to the lubricant injection apparatus 200 through a coupling member 201. Preferably, the coupling member 201 may be configured to be tightened using a tightening tool in order to perform the same function as the tightening protrusion 119c of FIG. 1.

The lubricant injection apparatus 200 includes an injection pipe 210 and a lubricant cylinder 220. The injection pipe 210 and the lubricant cylinder 220 are coupled to each other through a lubricant port body 215. The injection pipe 210 further includes an injection opening 211 formed at the junction with coupling member 201, as shown in FIG. 4, to provide a path for the lubricant to be injected into lubricant passages 119d of second valve shaft 119.

Lubricant port body 215 includes a lubricant port 215a formed at a side thereof. An upper portion of the lubricant port body 215 is coupled to a lower portion of the injection pipe 210 through a coupling means 217, such as a crown nut, and the lower portion of the lubricant port body 215 is coupled to a lubricant cylinder 220 through a coupling means 221, such as a crown nut.

The lubricant cylinder 220 includes a suction open 220a formed at end of the lubricant cylinder 220 opposite from the coupling member 201. A lubricant piston 225 is arranged in lubricant cylinder 220, and includes a piston rod 225a and an elastic member 223 having an elastic force, such as a spring. The piston rod 225a is coupled to a valve rod 213, which passes through an opening in a camping 227 and the lubricant port body 215 to extend into injection pipe 210. A valve head 213a of the valve rod 213 serves to open or close injection opening 211 of the injection pipe 210. A tube 229 having an uneven interior surface is arranged around valve rod 213 to prevent the lubricant from flowing into the opening of camping 227.

A cycle of operation of lubricant injection apparatus 200 of FIGS. 3 and 4 preferably includes: first, when gas is withdrawn from the lubricant cylinder 220 through the suction opening 220a, the lubricant piston 225 together with piston rod 225a, valve rod 213, and valve bead 213a move down, compressing elastic member 223 and opening injection opening 211 of injection pipe 210. An externally supplied lubricant, such as oil, flows into the injection pipe 210 through the lubricant port 215a of the lubricant port body 215, and then passes through the injection opening 211 to lubricant passages 119d. When gas pressure is re-applied to suction opening 220a, lubricant piston 225 is forced upward, injecting the lubricant into lubricant passages 119d in second valve shaft 119 and then to an inner surface of the cylinder 110 of the pneumatic valve shown in FIGS. 1, 2 and 2A thereby lubricating the interior of the cylinder of the pneumatic valve. Note that lubricant flowing into the injection pipe 210 does not flow into the opening in camping 227 due to the uneven interior surface of tube 229, thereby maintaining a clean atmosphere outside of the lubricant injection apparatus.

As described previously, the present invention features two primary advantages over conventional air valves. First, since the first and second valve shafts may be tightened by the tightening protrusion of the second valve shaft without disassembling the cylinder, a loosened coupling between the first and second valve shafts may be facilely repaired. Second, since friction of the piston against the cylinder is reduced, preferably by supplying a lubricant to the inner surface of the cylinder, a longer life span of the piston may be realized.

A preferred embodiment of the present invention has been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the invention as set forth in the following claims.

What is claimed is:

1. A pneumatic valve, comprising:
   a cylinder having at least one gas port for providing an inflow and outflow of a gas;
   a piston arranged in the cylinder and performing a reciprocating, straight-line movement in response to the inflow and outflow of the gas;
   a first valve shaft passing through the piston and having a first end portion including a first coupling portion;
   a second valve shaft including a second coupling portion connected to the first coupling portion and having a first end portion protruding from the cylinder; and
   a lubricant injection apparatus connected to the second valve shaft for supplying a lubricant to an inner surface of the cylinder through the second valve shaft,
   wherein the second valve shaft includes at least one lubricant passage therein.

2. A pneumatic valve as claimed in claim 1, wherein the first and second coupling portions have a threaded interface capable of mating.

3. A pneumatic valve as claimed in claim 2, wherein the first coupling portion includes a male threaded screw portion, and the second coupling portion includes a female threaded screw portion.

4. A pneumatic valve as claimed in claim 1, wherein the second valve shaft further includes a second end portion having a flange portion contacting the piston.

5. A pneumatic valve as claimed in claim 1, wherein the first end portion of the second valve shaft includes a tightening protrusion.

6. A pneumatic valve as claimed in claim 5, wherein the tightening protrusion has a groove.

7. A pneumatic valve as claimed in claim 5, wherein the tightening protrusion has a polygon-shape.

8. A pneumatic valve as claimed in claim 1, further comprising a bellows arranged around a second end portion of the first valve shaft.

9. A pneumatic valve a claimed in claim 8, further comprising an elastic member arranged between an outer surface of the cylinder and the bellows.

10. A pneumatic valve, comprising:
    a piston arranged in a cylinder;
    a first valve shaft pas sing through the piston and including a first coupling portion;
    a second valve shaft including a second coupling portion and at least one lubricant passage therein; and
    a lubricant injection apparatus connected to the second valve shaft for supplying a lubricant to an inner surface of the cylinder through the lubricant passage,
    wherein the first coupling portion of the first valve shaft is coupled to the second coupling portion of the second valve shaft so that the piston performs a reciprocating, straight-line movement in a longitudinal direction of the first and second valve shafts.

11. A pneumatic valve as claimed in claim 10, wherein the first and second coupling portions have a threaded interface capable of mating.

12. A pneumatic valve as claimed in claim 11, wherein the first coupling portion includes a male threaded screw portion, and the second coupling portion includes a female threaded screw portion.

13. A pneumatic valve as claimed in claim 11, wherein a first end portion of the second valve shaft, which is opposite to the piston, protrudes from the cylinder.

14. A pneumatic valve as claimed in claim 11, wherein the first end portion of the second valve shaft includes a tightening protrusion suitable for tightening by a tightening tool.

15. A pneumatic valve as claimed in claim 14, wherein the tightening protrusion has a groove.

16. A pneumatic valve as claimed in claim 14, wherein the tightening protrusion has a polygon-shape.

17. A pneumatic valve as claimed in claim 10, wherein the second valve shaft further includes a second end portion having a flange portion contacting the piston.

* * * * *